US008257170B2

(12) United States Patent
Linard et al.

(10) Patent No.: US 8,257,170 B2
(45) Date of Patent: Sep. 4, 2012

(54) DYNAMIC GAMING LIBRARY

(75) Inventors: Sylvie Linard, London (GB); Thierry Brunet de Courssou, Henderson, NV (US)

(73) Assignee: IGT, Reno, NV (US)

( * ) Notice: Subject to any disclaimer, the term of this patent is extended or adjusted under 35 U.S.C. 154(b) by 1147 days.

(21) Appl. No.: 11/874,911

(22) Filed: Oct. 19, 2007

(65) Prior Publication Data

US 2008/0113811 A1 May 15, 2008

Related U.S. Application Data

(60) Provisional application No. 60/865,830, filed on Nov. 14, 2006.

(51) Int. Cl.

| | |
|---|---|
| ***A63F 13/00*** | (2006.01) |
| ***A63F 13/12*** | (2006.01) |
| ***A63F 9/24*** | (2006.01) |
| *G06F 17/00* | (2006.01) |
| *G06F 19/00* | (2006.01) |

(52) U.S. Cl. ................ 463/29; 463/20; 463/23; 463/25; 273/138.1; 273/139; 705/56; 705/67; 713/170; 902/23

(58) Field of Classification Search .............. 463/16–23, 463/25–33, 39–43; 273/138.1, 139, 138.2, 273/141 A, 454–456, 460; 705/56–57, 64, 705/67, 72, 74–75, 78–79; 709/203–207, 709/FOR. 113; 713/1, 100, 150, 155, 170, 713/176, 182–184, 186–189, 300, 375, 400, 713/500, 600; 902/2–3, 23, 38, 40
See application file for complete search history.

(56) References Cited

U.S. PATENT DOCUMENTS

| | | | | |
|---|---|---|---|---|
| 5,277,424 | A * | 1/1994 | Wilms | 463/12 |
| 6,050,895 | A * | 4/2000 | Luciano et al. | 463/7 |
| 6,077,163 | A | 6/2000 | Walker et al. | |
| 6,508,709 | B1 * | 1/2003 | Karmarkar | 463/42 |
| 6,676,522 | B2 * | 1/2004 | Rowe et al. | 463/42 |
| 6,681,995 | B2 * | 1/2004 | Sukeda et al. | 235/492 |
| 6,875,110 | B1 * | 4/2005 | Crumby | 463/42 |
| 7,338,372 | B2 * | 3/2008 | Morrow et al. | 463/31 |
| 7,591,725 | B2 * | 9/2009 | Gatto et al. | 463/20 |
| 7,753,789 | B2 * | 7/2010 | Walker et al. | 463/42 |
| 7,841,938 | B2 * | 11/2010 | Gatto et al. | 463/25 |
| 7,963,839 | B2 * | 6/2011 | Gatto et al. | 463/16 |
| 8,105,155 | B2 * | 1/2012 | Kelly et al. | 463/25 |
| 2002/0142846 | A1 | 10/2002 | Paulsen | |
| 2002/0147040 | A1 | 10/2002 | Walker et al. | |

(Continued)

OTHER PUBLICATIONS

International Search Report mailed Apr. 10, 2008, in corresponding International Application No. PCT/US07/81866, filed Oct. 19, 2007.

(Continued)

*Primary Examiner* — Arthur O. Hall
(74) *Attorney, Agent, or Firm* — Clise, Billion & Cyr, P.A.; Richard E. Billion

(57) ABSTRACT

A method for casino operators and/or players to instantly "create" new games without requiring recertification by a gaming laboratory. New games are created on the fly by making combinations of game attributes including but not limited to theme, denomination, volatility, RTP. Game attributes are associated to pre-certified software components that are then dynamically linked to instantly offer a new game. Having players dynamically create games according to their preference totally removes the game operator's risk to compose menus of available games that players will not play.

11 Claims, 8 Drawing Sheets

U.S. PATENT DOCUMENTS

| | | | | |
|---|---|---|---|---|
| 2003/0003988 | A1 | 1/2003 | Walker et al. | |
| 2003/0078101 | A1 * | 4/2003 | Schneider et al. | 463/42 |
| 2003/0195031 | A1 | 10/2003 | O'Donovan et al. | |
| 2003/0211881 | A1 | 11/2003 | Walker et al. | |
| 2004/0166940 | A1 * | 8/2004 | Rothschild | 463/42 |
| 2004/0176157 | A1 | 9/2004 | Walker et al. | |
| 2004/0242322 | A1 * | 12/2004 | Montagna et al. | 463/29 |
| 2006/0063575 | A1 | 3/2006 | Gatto et al. | |
| 2006/0211493 | A1 * | 9/2006 | Walker et al. | 463/29 |
| 2006/0287098 | A1 * | 12/2006 | Morrow et al. | 463/42 |
| 2007/0060363 | A1 * | 3/2007 | Nguyen et al. | 463/42 |
| 2007/0155490 | A1 | 7/2007 | Phillips et al. | |
| 2007/0191111 | A1 * | 8/2007 | Sylla et al. | 463/43 |
| 2007/0213132 | A1 * | 9/2007 | Chilton et al. | 463/42 |
| 2008/0032787 | A1 * | 2/2008 | Low et al. | 463/29 |
| 2008/0064501 | A1 * | 3/2008 | Patel | 463/40 |
| 2008/0200258 | A1 * | 8/2008 | Swarna | 463/42 |
| 2008/0261699 | A1 * | 10/2008 | Topham et al. | 463/42 |
| 2009/0221366 | A1 * | 9/2009 | Ward et al. | 463/30 |
| 2011/0183762 | A1 * | 7/2011 | Topham et al. | 463/42 |

OTHER PUBLICATIONS

Written Opinion mailed Apr. 10, 2008, in corresponding International Application No. PCT/US07/81866, filed Oct. 19, 2007.

International Preliminary Report on Patentability mailed Oct. 21, 2008 in corresponding International Application PCT/US07/81866.

* cited by examiner

DYNAMIC GAMING LIBRARY

This application claims the benefit under 35 U.S.C. §119 (e) of provisional Application No. 60/865,830, filed Nov. 14, 2006.

BACKGROUND OF THE INVENTION

The present inventions relate generally to the field of regulated pay computer-controlled games, either games of skills or games of chance.

SUMMARY OF THE INVENTION

A method for casino operators and/or players to instantly "create" new games without requiring recertification by a gaming laboratory. News games may be created on the fly by making combinations of game attributes including but not limited to theme, denomination, volatility, RTP. Game attributes are associated to pre-certified software components that are then dynamically linked to instantly offer a new game. Having players dynamically create games according to their preference mitigates the risk inherent in the game operator configuring games and/or composing menus of available games that players may not find to their liking and may not play.

The Dynamic Gaming Library according to embodiments of the present invention may include two interfaces; namely, a casino operator interface and a player interface. The casino operator interface may include functionality that allows casino operators to draw upon a repository of possible game attributes to dynamically "create" new games on-the-fly without requiring certification or recertification of the newly created game by a certification laboratory. Such attributes may include, for example, denomination, RTP, payline configurations, payback profiles, theme, and game play features. Once a game is "created" it may be made available during hours of the operator's choosing via menus within gaming machines on the casino floor.

The player interface may include functionality that allows players to dynamically "create" games on-the-fly (without requiring recertification by a certification laboratory) and play games based on their individual preferences. Casino operators may control which game variables the player is allowed to control. The player-controlled variables may include, for example, themes, denominations, volatility profiles and features.

Both of these interfaces make it possible for casino operators to offer players and for the players to choose from a nearly limitless library of games without occupying more space on the casino floor than is used by gaming machines configured according to more traditional gaming models.

Accordingly, an embodiment of the present invention is a method of adding a new game on a regulated gaming machine. The method may include steps of providing a library of regulatorily pre-certified software components that can execute on the regulated gaming machine; providing a menu of player-configurable regulated game titles that are playable on the regulated gaming machine, each game title being associated with a first at least one regulatorily pre-certified software component; receiving a title selection, from a player of the regulated gaming machine, of one of the regulated game titles from the provided menu of regulated game titles; providing a menu of betting configurations that are compatible with the selected regulated game title, each betting configuration being associated with a second at least one regulatorily pre-certified software component, the betting configurations including at least one of denomination and percentage Return To Player; receiving a configuration selection, from the player of the regulated gaming machine, of at least one of the betting configurations from the provided menu of betting configurations; configuring a new game to include at least the first at least one regulatorily pre-certified software component and the second at least one regulatorily pre-certified software component; adding the new game to the regulated gaming machine, and enabling game play on the regulated gaming machine of the new game.

The method may further include a step of saving the selected regulated game title, the selected betting configuration and an identification of the new game to a player loyalty card database to enable subsequent game play of the new game on any regulated gaming machine coupled to the player loyalty card database. The method may further include a step of removing the new game upon command, after the player leaves the regulated gaming machine subsequent to cash-out or subsequent to a player balance reaching zero.

According to another embodiment, the present invention is a player-configurable regulated gaming machine. The player-configurable regulated gaming machine may include a first menu of player-configurable regulated game titles that are playable on the regulated gaming machine, each game title being associated with a first at least one regulatorily pre-certified software component that can execute on the regulated gaming machine; a first user interface component configured to enable selection, by a player of the regulated gaming machine, of one of the regulated game titles from the provided first menu; a second menu of betting configurations that are compatible with the selected regulated game title, each betting configuration being associated with a second at least one regulatorily pre-certified software component that can execute on the regulated gaming machine, the betting configurations including at least one of denominations, bonus styles, paylines and percentage return to player and volatility profiles; a second user interface component configured to enable selection, by the player of the regulated gaming machine, of at least one of the betting configurations from the provided second menu, and a new game enabled for game play, the new game being configured according to a player selected one of the regulated game titles and according to a player selected at least one of the betting configurations, the new game including at least the first at least one regulatorily pre-certified software component and the second at least one regulatorily pre-certified software component.

The regulated gaming machine may be further configured to save the selected betting configuration and an identification of the selected regulated game to at least one of a player loyalty card and a player loyalty card database. The regulated gaming machine may further include a pointing device configured to enable the player to select one of the regulated game titles from the first menu of player-configurable regulated game titles. A pointing device may be configured to enable the player to select one of the betting configurations from the second menu of betting configurations. A loyalty card interface coupled to the regulated gaming machine may be configured to enable the selected regulated game title, the selected betting configuration and an identification of the new game to be saved to a player loyalty card database to enable the new game to be played on any regulated gaming machine coupled to the player loyalty card database. The regulated gaming machine may be configured to remove the new game upon command, after the player leaves the regulated gaming machine subsequent to cash-out or subsequent to a player balance reaching zero. The regulated gaming machine may be coupled to a network that may include a plurality of player-configurable regulated gaming machines and a central server, and a library storing the regulatorily pre-certified software components may be stored in the central server and the regulated gaming machine may be configured to retrieve the first at least one regulatorily pre-certified software component and the second at least one regulatorily pre-certified software component from the central server over the network when configuring the new game.

According to yet another embodiment thereof, the present invention is a method of adding a new game to a plurality of regulated gaming machines. The method may include steps of providing a menu of regulated game titles that are playable on the plurality of regulated gaming machines, each game title being associated with a first at least one regulatorily pre-certified software component that can execute on the plurality of regulated gaming machines; receiving a title selection, from an operator of the plurality of regulated gaming machines, of one of the regulated game titles from the provided menu of regulated game titles; providing a menu of betting configurations that are compatible with the selected regulated game title, each betting configuration being associated with a second at least one regulatorily pre-certified software component that can execute on the regulated gaming machines, the betting configurations including at least one of denominations, bonus styles, paylines and percentage return to player and volatility profiles; receiving a configuration selection, from the operator of the plurality of regulated gaming machine, of at least one of the betting configurations from the provided menu of betting configurations; configuring a new game to include at least the first at least one regulatorily pre-certified software component and the second at least one regulatorily pre-certified software component; receiving, from the operator, a selection of at least one of the plurality of regulated gaming machines on which the new game may be to be enabled, and enabling game play of the configured new game on the selected at least one regulated gaming machine.

The method may further include returning to the first providing step to enable selection, configuration and enablement of additional regulated games on additional selected ones of the plurality of regulated gaming machines. The method may also include selecting a time interval during which the selected regulated gaming machine is to enable game play of the configured new game. The method may also include storing at least an identification of each of the plurality of regulated gaming machines, each enabled regulated game, the betting configuration selected for each identified regulated game and the time interval during which each regulated game configured according to the selected betting configuration may be to be enabled in a games library. The method may further include a step of configuring each regulated gaming machine to enable game play according to information stored in the games library. The menu of betting configurations providing step may be carried out with the betting configurations including one or more of a plurality of player-selectable volatility payout profiles, a plurality of percentage Return To Player (RTP) profiles, a plurality of paylines and a plurality of volatility profiles, for example. The method may further include receiving a remove command from the operator, the received remove command being effective to remove the new game from the selected at least one regulated gaming machine.

According to yet another embodiment, the present invention is a player-configurable regulated gaming machine, comprising a player initiated game configuration wizard software component executing on the regulated gaming machine, the game configuration wizard providing the player with automated step-by-step guidance through a selection of player-configurable regulated game titles that are playable on the regulated gaming machine, each game title being associated with a first at least one regulatorily pre-certified software component that can execute on the regulated gaming machine, and through a selection of betting configurations that are compatible with the selected regulated game title, each betting configuration being associated with a second at least one regulatorily pre-certified software component that can execute on the regulated gaming machine, the betting configurations including at least one of denominations, bonus styles, paylines and percentage Return To Player and volatility profiles, and a new game configured and enabled for game play by the player initiated game configuration wizard, the new game including the first at least one regulatorily pre-certified software component and the second at least one regulatorily pre-certified software component.

The regulated gaming machine may be further configured to save the selected betting configuration and an identification of the selected regulated game to a player loyalty card by the player initiated game configuration wizard. The regulated gaming machine may further include a loyalty card interface configured to enable the selected regulated game title, the selected betting configuration and an identification of the new game to be saved to a player loyalty card database to enable the new game to be played on any regulated gaming machine coupled to the player loyalty card database. The regulated gaming machine may be configured to remove the new game upon command, after the player leaves the regulated gaming machine subsequent to cash-out or subsequent to a player balance reaching zero. The regulated gaming machine may be coupled to a network that may include a plurality of player-configurable regulated gaming machines and a central server, a library of the regulatorily pre-certified software components may be stored in the central server and the regulated gaming machine may be configured to retrieve the first at least one regulatorily pre-certified software component and the second at least one regulatorily pre-certified software component from the central server over the network when configuring the new game.

Still another embodiment of the present invention is a distributed game system comprising: a network; a central system coupled to the network; a plurality of regulated gaming machines coupled to the network; a library, accessible to each of the plurality of regulated gaming machines, of regulatorily pre-certified software components that can execute on each of the plurality the regulated gaming machines; an operator-initiated game configuration wizard software component executing on the central system, the game configuration wizard providing the operator with an automated step-by-step guidance through a selection of operator-configurable regulated game titles that are playable on the plurality of regulated gaming machine, each game title being associated with a first at least one regulatorily pre-certified software component, and through a selection of betting configurations that are compatible with the selected regulated game title, each betting configuration being associated with a second at least one regulatorily pre-certified software component, the betting configurations including at least one of denominations, bonus styles, paylines and percentage Return To Player and volatility profiles, and a new game configured and enabled for game play by the operator-initiated game configuration wizard, the new game including the first at least one regulatorily pre-certified software component and the second at least one regulatorily pre-certified software component.

The central system and the plurality of regulated gaming machines may be configured such that the new game is removable from all or selected ones of the plurality of regulated gaming machines upon a command from the central system. A pointing device may be provided and the operator-initiated game configuration wizard may be configured to use the pointing device.

DETAILED DESCRIPTION

Figure 1:
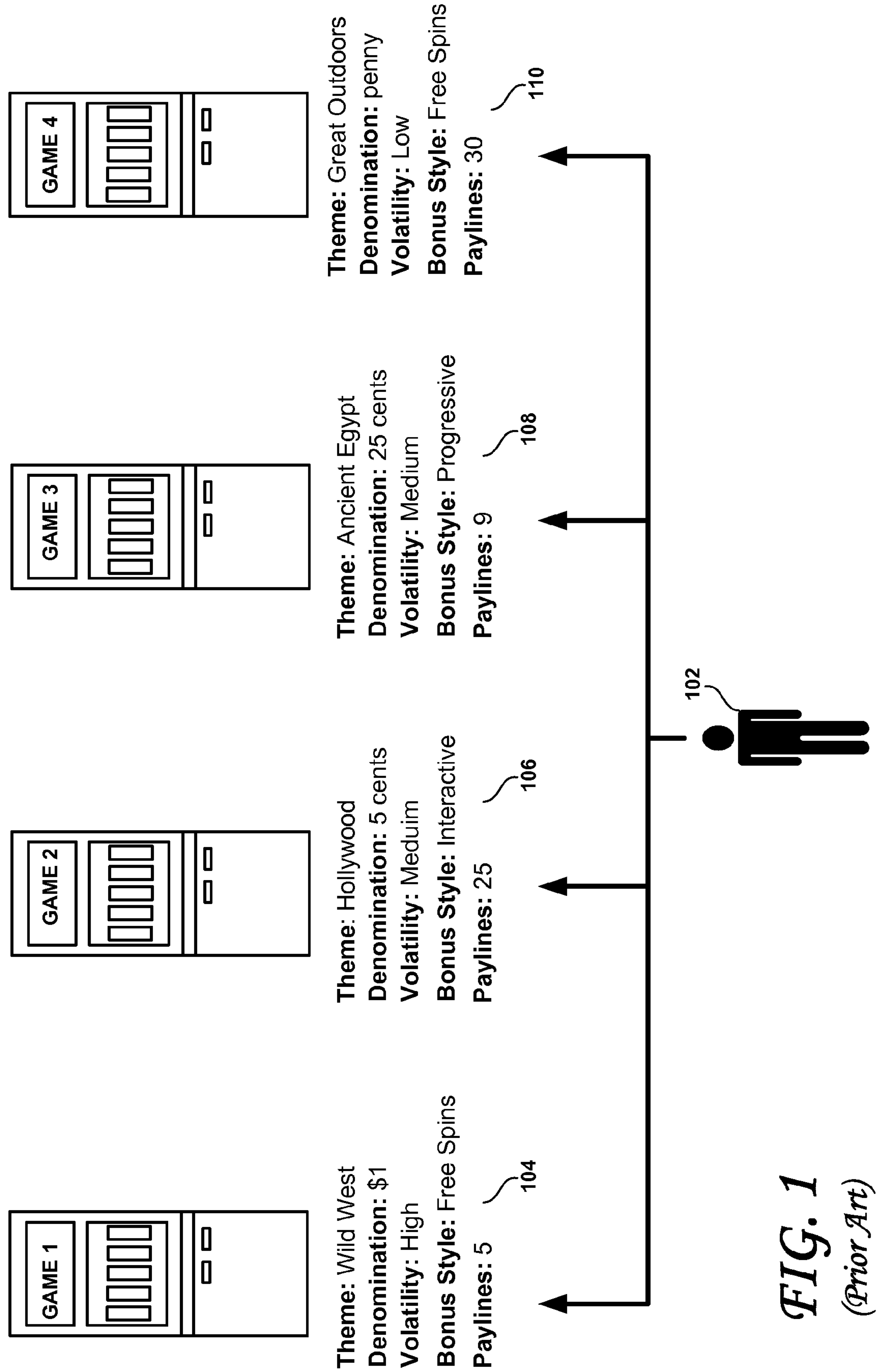
FIG. 1 (Prior Art)
FIG. 1 depicts a conventional method of player game selection.

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense.

The electronic gaming industry has evolved considerably in the past quarter century. Whereas early electronic games of chance offered players relatively few choices and exhibited relatively few distinguishing characteristics, electronic slot machines of the modern era are individually configured according to a wide variety of combinations of themes, features, payback profiles and betting configurations such that much more varied gaming experiences are now possible. Despite these advancements, the mechanisms in place for players to select games have improved very little. The inventions defined herein include within their scope a recognition that currently available gaming machines and methods for gaming are inflexible and cannot be configured dynamically according to players' preferences or according to the casino operator's wishes. Indeed, conventionally, a player hoping to play a soccer-themed penny slot machine with nine paylines, an interactive bonus round, and infrequent but large payouts would have to hope that a casino game manufacturer had programmed a game with this exact theme and volatility/feature profile and that his or her local casino's slot manager had decided to purchase such a game and configure it in the desirable denomination. Obviously, such a chain of events is unlikely, meaning that the hypothetical player is unlikely to be accommodated.

Indeed, no machines and methods are known to exist that allow players to pair a theme and denomination with a payback profile, betting configuration, and game play features of their choosing. As alluded to above, these limitations do not only affect players, but also casino operators. Indeed, the systems in place for casino operators to choose and schedule games could also be made more flexible. While the advent of server-based gaming and the creation of more sophisticated casino management systems have made it easier for game operators manage their estate of gaming machines, no existing gaming system allows game operators to dynamically link themes, features, denominations, Return To Player (RTP), and volatility profiles to create customized game offerings.

Embodiments of the present inventions include the realization that current game distribution and player game selection methods force game manufacturers to guess what game operators want and game operators to guess what players want. Given this limitation, methods and systems capable of eliminating guesswork and empowering game operators and players to exert more control over the gaming experience would be highly desirable.

FIG. 1 depicts a conventional method of player game selection within the casino. As shown, players conventionally had the ability to choose only those preprogrammed game profiles provided at their local gaming destination. Under this conventional paradigm, game play options are limited and a player 102 (such as shown in FIG. 1) who is presented with, for example, four distinct gaming machines, may only choose from among the available four games 104, 106, 108 and 110.

The limitation described above is due in part to the format of the majority of existing casino games, which function much like standard coin operated video games, offering a fixed number of preprogrammed game profiles, with this fixed number typically being one. For instance, "GAME 1" 104 is preprogrammed to feature a Wild West theme, a $1 denomination, high volatility, free spins, and five paylines. A player wishing to play a Wild West themed game in a smaller denomination or with different bonus features would not be accommodated in the conventional model unless he or she could find such a game profile preprogrammed into another existing game on the casino floor—an unlikely proposition.

Figure 2:
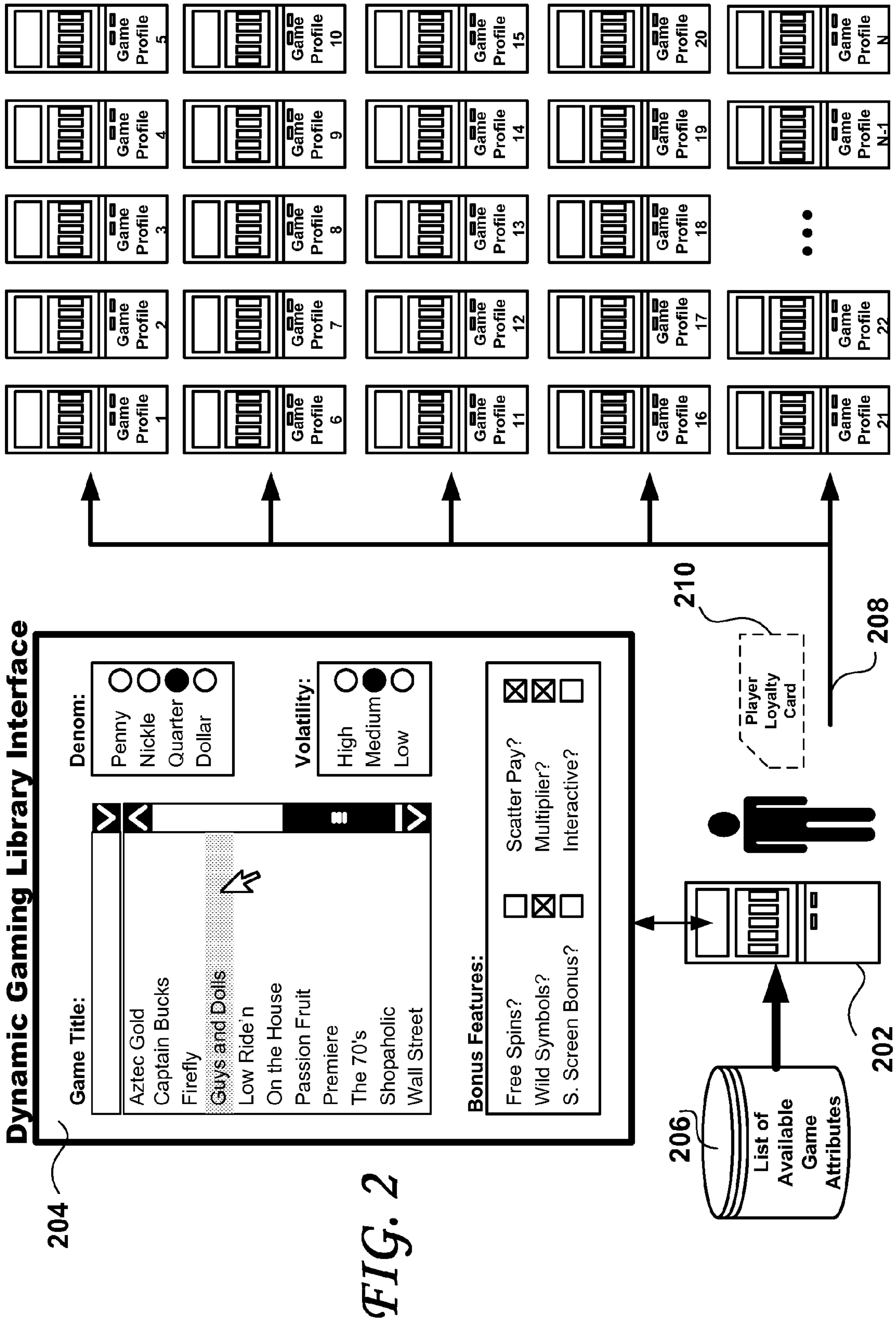
FIG. 2 depicts how players may create games using the Dynamic Gaming Library according to embodiments of the present inventions.

FIG. 2 depicts how players might create games using the Dynamic Gaming Library according to an embodiment of the present invention. Instead of having a long menu list of all available games, gaming machines configured according to embodiments of the present invention such as shown at 202 (that is, gaming machines that include a Dynamic Gaming Library) allow players to select features that appeal to them from a library of available features, to thereby dynamically and instantly create a new game of their choosing. An exemplary gaming menu offering, say, 50 possible themes (e.g., Aztec Gold, Captain Bucks, Firefly . . . ), four possible denominations (for example, $1, $0.25, $0.10, $0.05 and 1¢), 3 possible volatility profiles (e.g., High, Medium and Low), and 64 possible bonus feature configurations (for example, Free Spin, Wild Symbols, S. Screen Bonus, Scatter Play and the like) would yield 38,400 possible game profiles (combination of games and features). Therefore, without an embodiment of the present invention, an unwieldy menu listing 38,400 games would be required to offer the same portfolio of choices to the player. When a "game" includes a unique combination of theme, game play features, payback profile, and betting configuration, it becomes clear how the Dynamic Gaming Library makes it possible for casino operators to expand their game libraries exponentially and for players to choose from among a very large library of available games.

The exemplary player game selection interface 204 depicted in FIG. 2 may include a window to allow players to make selections from a list of available game attributes 206 (stored within the gaming machine 202 or stored in a database that is accessed by the gaming machine 202 over a computer network, for example) to dynamically create and then play the dynamically created games, which games then are configured to include features of their choosing. Alternate interfaces are also possible and embodiments of the present invention are not limited to the multi-window wizard form shown in the figures. According to embodiments of the present invention, casino operators may control aspects of the appearance and content of the player interface, and may control which game attributes are available for the player to customize. Some possible player-controlled game attributes include themes, denominations, volatility profiles and features. It is to be understood, however, that other player-controlled attributes are possible within the scope of the present inventions described herein.

It should be noted that, in contrast to the conventional paradigm shown in FIG. 1 in which four distinct gaming machines yielded only four possible games, the Dynamic Gaming Library method of game selection 208 makes it possible for a player to access a great many games (thousands of games, for example) via a single gaming machine. As the list of potential game themes and features continues to grow, libraries featuring millions of potential games profiles may become possible. Numeral 208 illustrates conceptually an equivalent portfolio library of N distinct games from which a player may select a preferred game on gaming machine 202.

If a player tracking system is in place on a gaming machine that is linked to the Dynamic Gaming Library according to embodiments of the present invention, then the player's game and/or feature selections may be recorded on a player loyalty card 210 and retrieved later, such as when the player moves to a different gaming machine or upon the player's next visit to the casino.

Figure 3:
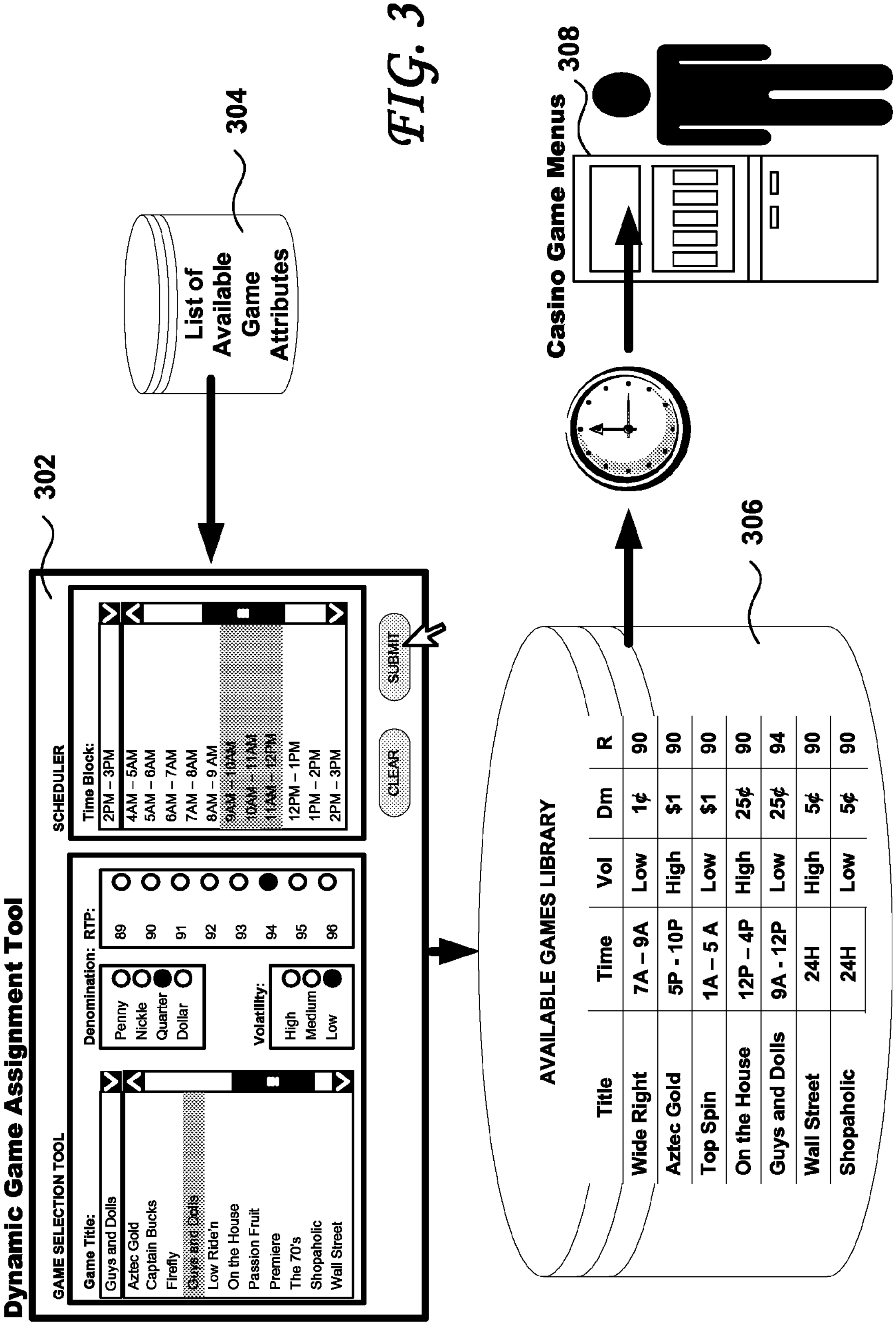
FIG. 3 depicts a high-level view of a casino operator interface within the Dynamic Gaming Library, according to further embodiments of the present invention.

FIG. 3 depicts a high-level view detailing how an exemplary casino operator interface for the Dynamic Gaming Library may function on a casino floor. The exemplary interface depicted at reference numeral 302, called the "Dynamic Game Assignment Tool," may use a window-based interface (for example) to enable game operators to draw upon a list of possible game attributes 304 to create and make available a dynamic library of games on all or selected ones of the gaming machines within the casino. Such customizable attributes may include, but are not limited to, denomination, RTP, volatility profiles, themes and features. Other user interfaces may also be used, such as, for example, a multi-window wizard (shown in FIGS. 4-8).

Game operators may use a game assignment interface to create a library 306 of available dynamically created games. Each game in the library 306 may be associated with a unique identifier and may also be made active and available to players on all or selected gaming machines during operator-selected set time periods or intervals. Such time periods or intervals may also include days of the week (e.g., weekdays or weekends) and holidays. For example, differently themed games may be selected (or different themes selected for selected games) during certain selected times of the year (summertime, spring) or during selected holidays. Dynamically created games may be given a limited life time via a schedule parameter. After such limited life time, the dynamically created game may be automatically destroyed or otherwise made unavailable to the player. Embodiments of the present inventions may be used in conjunction with the methods, systems and functionality described in commonly assigned and co-pending U.S. application Ser. No. 11/245,955, filed Oct. 6, 2005, which application is hereby incorporated herein by reference in its entirety. Gaming machines 308 on the casino floor may include player-selectable menus that include and list only games that are available for game play during the current time. That is, a player will not be able to view or select dynamically created games that have not been programmed to be available during the time of his or her gaming session. Thus, whereas the dynamic game library according to embodiments of the present invention and the casino operator interface shown herein present a breakthrough in game library creation and expansion, the player's experience in selecting games may remain unchanged if the operator so desires.

Figure 4:
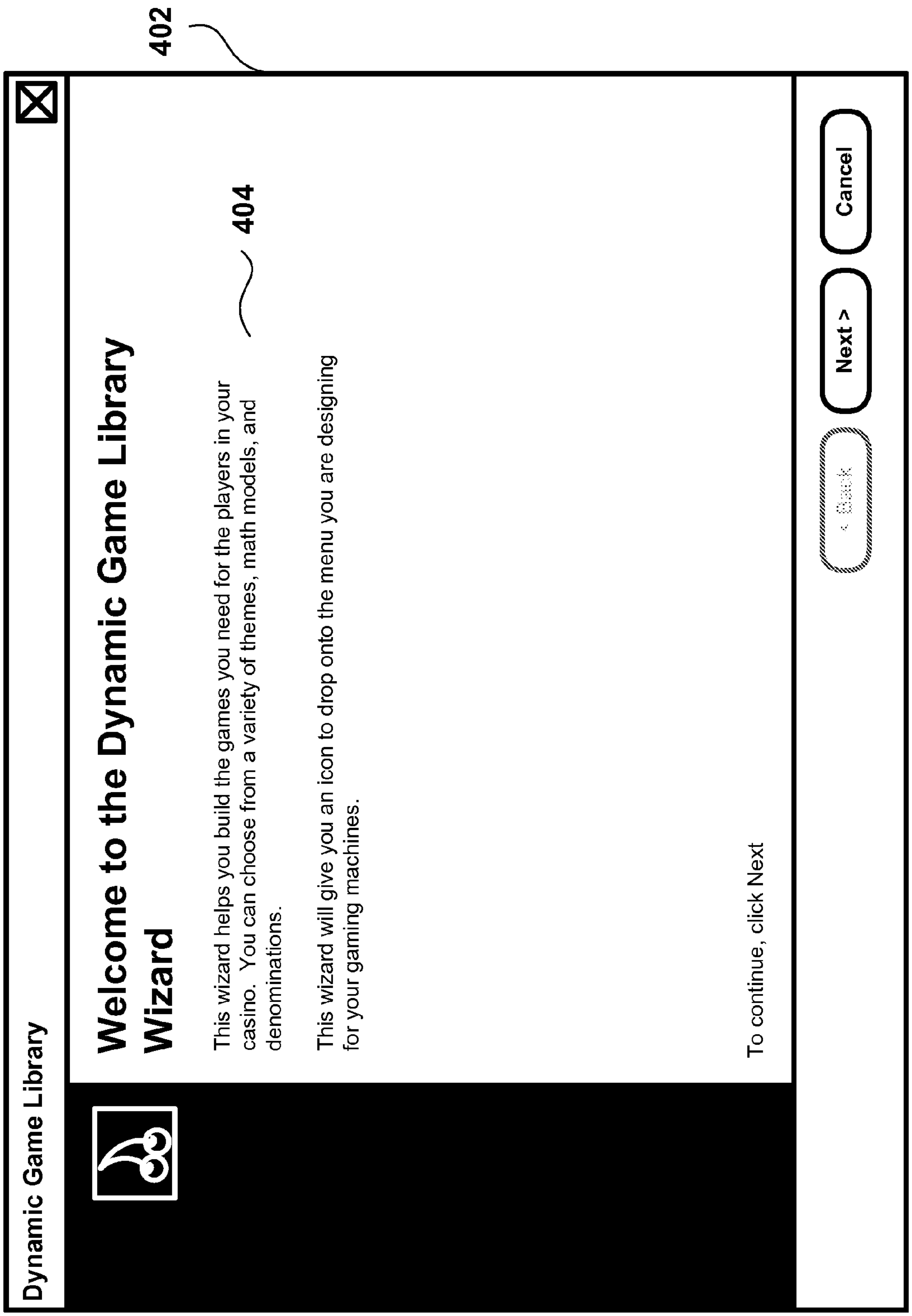
FIG. 4 depicts an introductory window of a dynamic game library wizard accessible by the casino game operator or the player, according to further embodiments of the present invention.

FIG. 4 shows an example of an introductory window 402 of a dynamic game library wizard accessible by the casino game operator via a console or by a player via the gaming machine display, according to an embodiment of the present invention. Such a wizard may be a means of allowing game operators or players to customize and build dynamic game libraries in a user friendly manner 404. It is understood that other mechanisms for allowing casino operators or players to dynamically build new games according to embodiments of the present invention are also possible.

Figure 5:
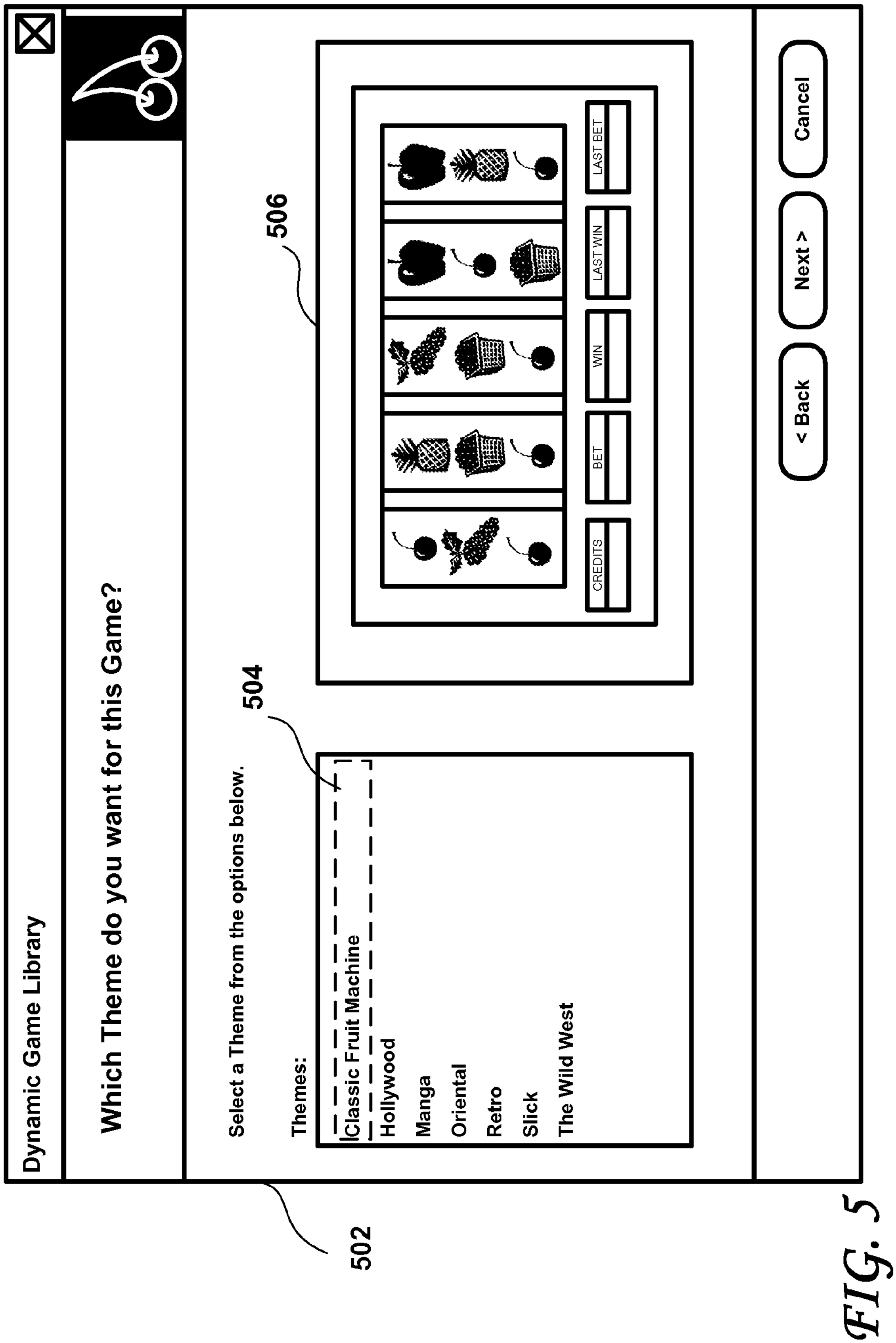
FIG. 5 depicts a theme selection window in a dynamic game library wizard accessible by the casino operator or the player, according to still further embodiments of the present invention.

FIG. 5 shows a theme selection window 502 in a dynamic game library wizard accessible by the casino operator via a console or by a player via the gaming machine display, according to an embodiment of the present invention. In the window 502, the game operator or player may select a desired game theme 504 from a list of available themes. A screen shot 506 of the selected game theme 504 may be generated to allow the casino operator or player to see how the selected theme looks before finalizing his or her selection. According to another embodiment of the present inventions, when a theme is selected that encompasses multiple games, a secondary window may appear featuring all available game titles that are categorized under that theme, such that the game operator or player may link desired game attributes to an individual game title, across a plurality of game titles or across and entire theme.

Possible game themes may include most any imaginable topic, style, format, skins, preference, subject matter or interest such as, for example, Ancient Egypt, Jungle, Underwater, Jewelry, Tropical, Fruit, Classic Reel Spinner, Wild West, Money, Outer Space, The Great Outdoors, Fishing, Sports, Monsters, Retro, Cute Animals, Fantasy, Magic/Supernatural, Game Shows, Asian, Hispanic, The Beach, Hollywood Icons, to name but a few of the limitless possibilities. Indeed, game themes and other attributes are only limited by the creativity and skill of game designers and graphic artists. The available themes may be updated as new themes are developed.

Figure 6:
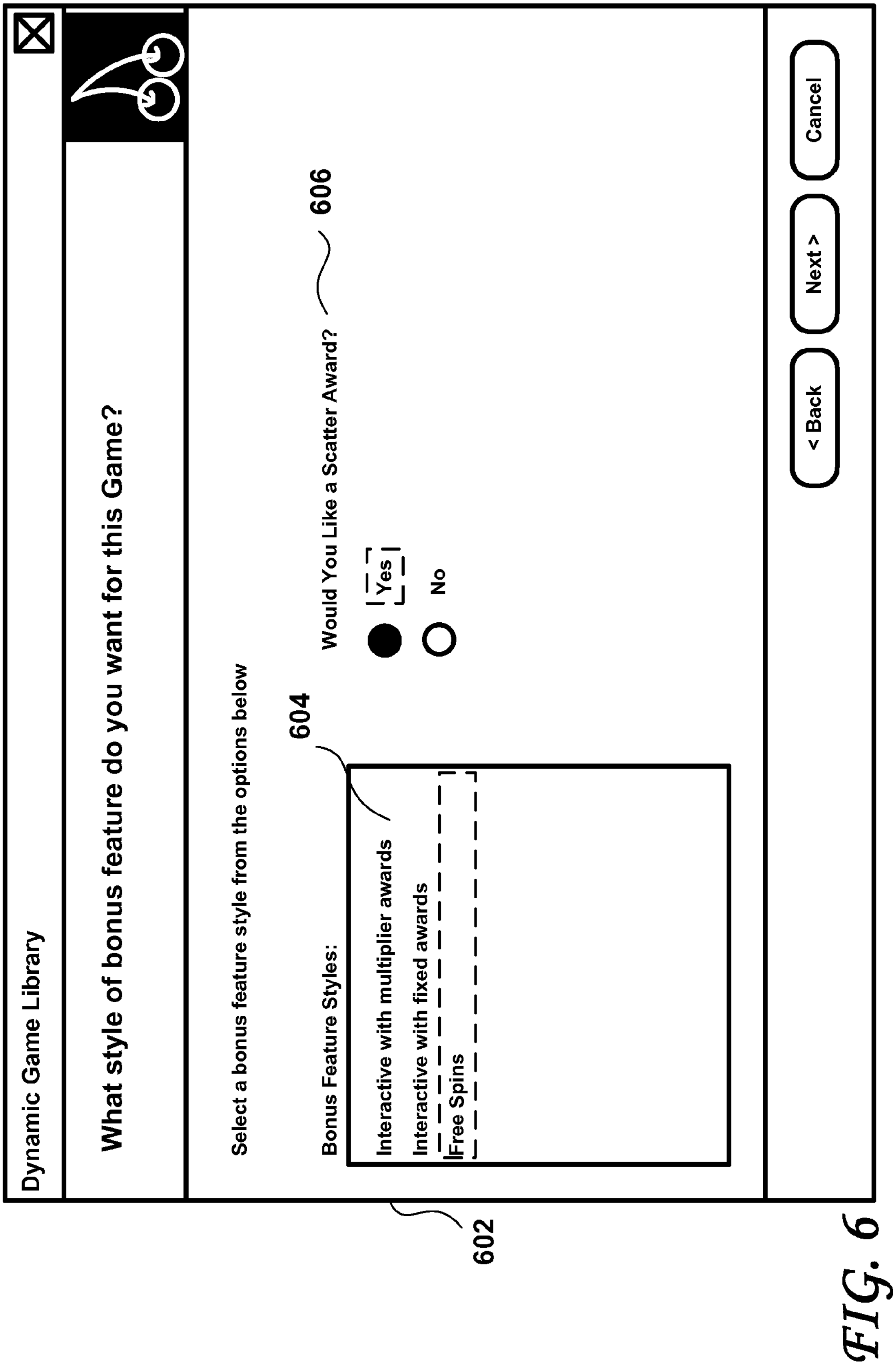
FIG. 6 depicts a bonus-style selection window in a dynamic game library wizard accessible by the casino operator or the player, according to an embodiment of the present invention.

FIG. 6 shows a bonus style selection window 602 in a dynamic game library wizard accessible by the casino operator via a console or by a player via the gaming machine display, according to further aspects of embodiments of the present inventions. The featured window 602 allows game operators or players to tailor a game's bonusing profile to their specifications or liking. Configurable bonus features 604 may include, for example, free spins, wild symbols, multipliers, interactivity, progressive bonuses, and scatter pay symbols 606. Other bonus features may also be developed and incorporated within the available list of bonus feature styles that are selectable by the casino operator or the player.

Figure 7:
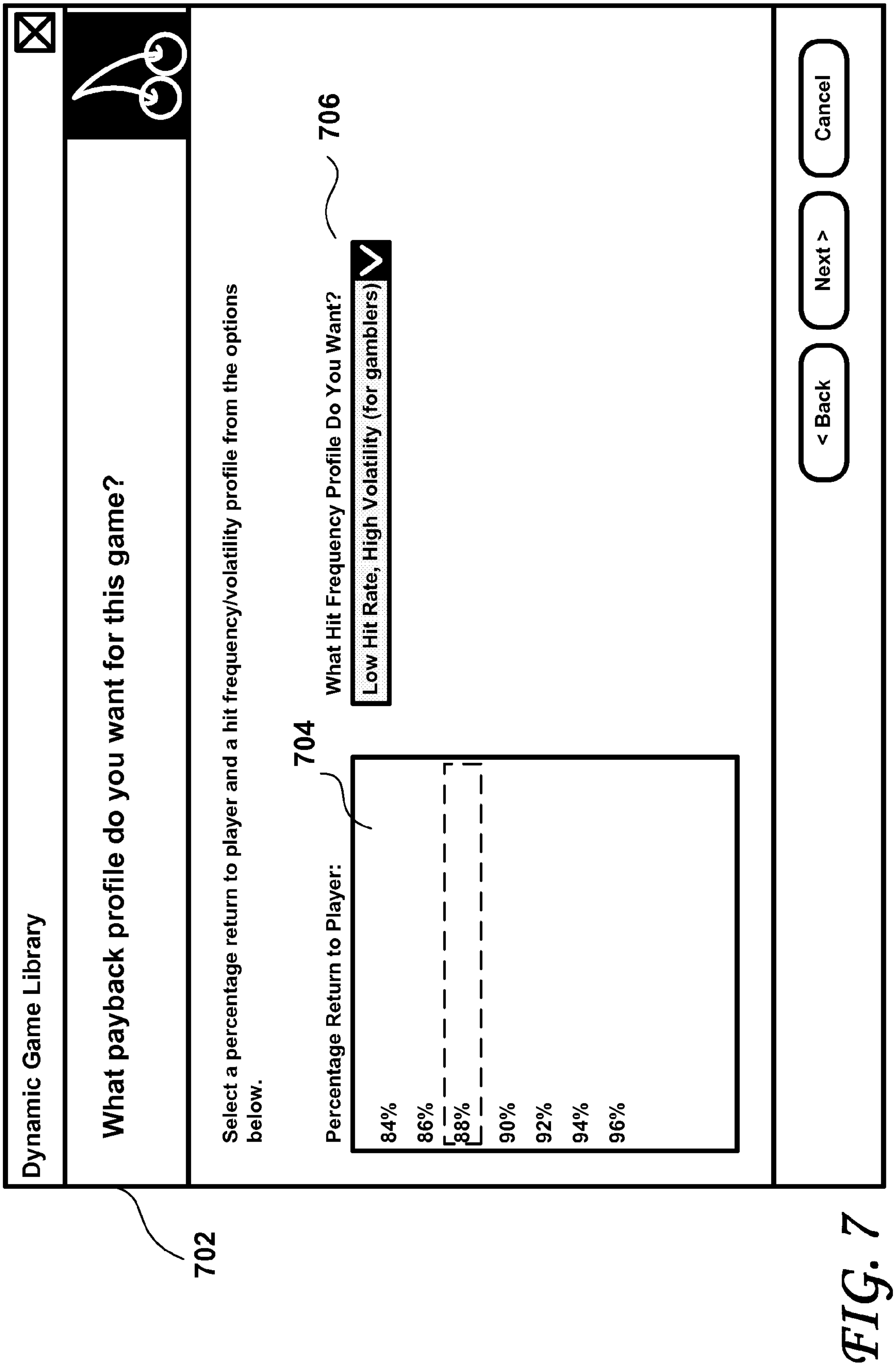
FIG. 7 depicts a payback profile window in a dynamic game library wizard accessible by the casino operator or the player, according to still further embodiments of the present invention.

FIG. 7 shows a payback profile window 702 in a dynamic game library wizard accessible by the casino operator via a console or by a player via the gaming machine display, according to further embodiments of the present inventions. In this window 702, the casino operator or player may configure a game's payback profile. Configurable elements of the payback profile may include, but are not limited to: the percentage of funds returned to the player (RTP) 704 and the volatility profile 706. Games may be configured to feature many small payouts (low volatility), infrequent but large payouts (high volatility) or with an alternate payout structure of the operator's or player's choosing. Other payback profiles may be devised and incorporated into the window 702, as those of skill in this art may recognize.

Figure 8:
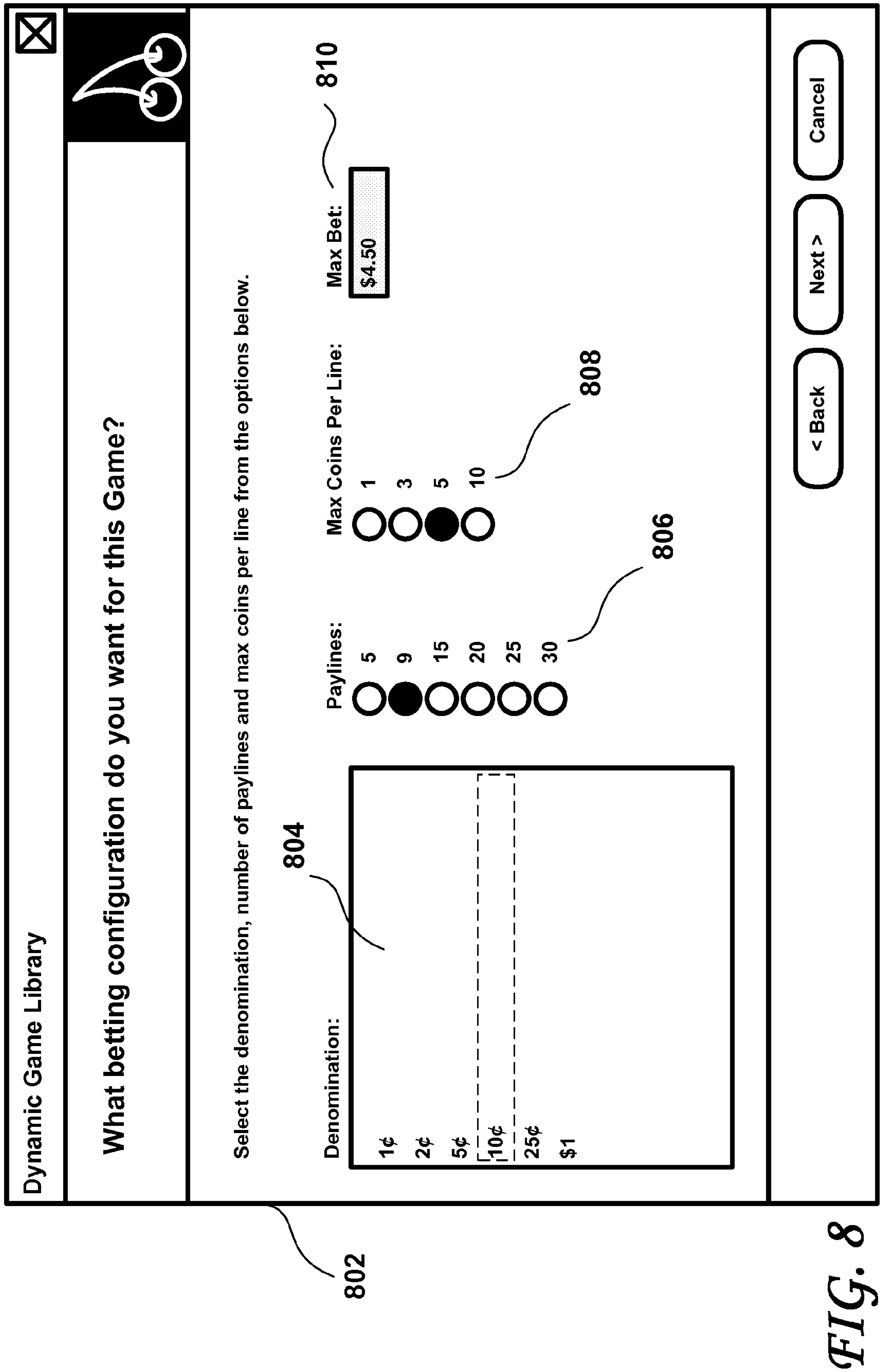
FIG. 8 depicts a betting configuration window in a dynamic game library wizard accessible by the casino operator or the player, according to embodiments of the present invention.

FIG. 8 depicts a betting configuration window 802 in a dynamic game library wizard accessible by the casino operator via a console or by a player via the gaming machine display, according to further aspects of embodiments of the present inventions. Operators or players may use the tool to specify how to bet on the game or games being configured. Some possible betting elements that may be specified may include, for example, game denomination 804, paylines played 806, and max coins bet per line 808. The window 802 may also display the Max Bet 810 on a "created" game based on parameters input by the operator. For instance, if the operator or player specifies a 10 cent game with nine paylines and a max bet of 5 coins per line, the window 810 would display \$4.50, as the max bet since \$0.10×5×9=\$4.50.

The Dynamic Gaming Library casino game selection tool (shown in FIGS. 3-8), according to embodiments of the present invention, may be executable from a centrally located computer (e.g., a Microsoft Windows®-based personal computer) coupled to a plurality of gaming machines over a computer network or from a selected gaming machine. The centrally located computer may be in a secure location with limited access. Alternatively, the game creation tool may be accessible from any gaming machine within the estate, with appropriate safeguards. Some or all of the player-selectable functionality described and shown herein (such as the functionality shown and described relative to FIG. 2) may be accessible from any of the gaming machines within the casino.

While the foregoing detailed description has described several embodiments of this invention, it is to be understood that the above description is illustrative only and not limiting of the disclosed invention. For example, while a dynamic game library featuring slot machines was described in detail, a dynamic library of electronic roulette games, card games, and video games with a wagering component would also fit within the scope this invention. Indeed, a number of modifications will no doubt occur to persons of skill in this art. All such modifications, however, should be deemed to fall within the scope of the present invention.

The invention claimed is:

1. A method of adding a new game on a regulated gaming machine, comprising:

providing a library of regulatorily pre-certified software components configured to execute on the regulated gaming machine;

providing a menu of player-configurable regulated game titles that are playable at the regulated gaming machine, each game title being associated with a first at least one regulatorily pre-certified software component;

receiving a title selection, from a player of the regulated gaming machine, of one of the regulated game titles from the provided menu of regulated game titles;

providing a menu of betting configurations that are compatible with the selected regulated game title, each betting configuration being associated with a second at least one regulatorily pre-certified software component, the betting configurations including at least one of denomination and percentage Return To Player;

receiving a betting configuration selection, from the player of the regulated gaming machine, of at least one of the betting configurations from the provided menu of betting configurations;

configuring a new game to include the received betting configuration selection and at least the first at least one regulatorily pre-certified software component and the second at least one regulatorily pre-certified software component, the first at least one regulatorily pre-certified software component and the second at least one regulatorily pre-certified software component subsequently dynamically linked to provide a configured new game without requiring recertification of the new game by a gaming laboratory;

adding the configured new game to the regulated gaming machine, and enabling game play and execution of the configured new game on the regulated gaming machine.

2. The method of claim 1, further comprising a step of saving the selected regulated game title, the betting configuration selection and an identification of the new game to a player loyalty card database to enable subsequent game play of the new game on any regulated gaming machine coupled to the player loyalty card database.

3. The method of claim 1, further comprising a step of removing the new game upon command, after the player leaves the regulated gaming machine subsequent to cash-out or subsequent to a player balance reaching zero.

4. A player-configurable regulated gaming machine, comprising:

a first menu of player-configurable regulated game titles that are playable on the regulated gaming machine, each game title being associated with a first at least one regulatorily pre-certified software component configured to execute on the regulated gaming machine;

a first user interface component configured to enable selection, by a player of the regulated gaming machine, of one of the regulated game titles from the provided first menu;

a second menu of betting configurations that are compatible with the selected regulated game title, each betting configuration being associated with a second at least one regulatorily pre-certified software component configured to execute on the regulated gaming machine, the betting configurations including at least one of denominations, bonus styles, paylines and percentage return to player and volatility profiles;

a second user interface component configured to enable selection, by the player of the regulated gaming machine, of at least one of the betting configurations from the provided second menu, and a new game enabled for game play and execution on the regulated gaming machine, the new game being configured according to a player selected one of the regulated game titles and according to a player selected at least one of the betting configurations, the configured new game including at least the first at least one regulatorily pre-certified software component dynamically linked to the second at least one regulatorily pre-certified software component, to provide a configured new game without requiring recertification of the new game by a gaming laboratory.

5. The gaming machine of claim 4, wherein the regulated gaming machine is further configured to save the selected betting configuration and an identification of the selected regulated game to at least one of a player loyalty card and a player loyalty card database.

6. The gaming machine of claim 4, further comprising a pointing device configured to enable the player to select one of the regulated game titles from the first menu of player-configurable regulated game titles.

7. The gaming machine of claim 6, wherein the regulated gaming machine is coupled to a network that includes a plurality of player-configurable regulated gaming machines and a central server, and wherein a library storing the regulatorily pre-certified software components is stored in the central server and wherein the regulated gaming machine is configured to retrieve the first at least one regulatorily pre-certified software component and the second at least one regulatorily pre-certified software component from the central server over the network when configuring the new game.

8. The gaming machine of claim 4, further comprising a pointing device configured to enable the player to select one of the betting configurations from the second menu of betting configurations.

9. The gaming machine of claim 4, further comprising a loyalty card interface configured to enable the selected regulated game title, the selected betting configuration and an identification of the new game to be saved to a player loyalty card database to enable the new game to be played on any regulated gaming machine coupled to the player loyalty card database.

10. The gaming machine of claim 4, wherein the regulated gaming machine is configured to remove the new game upon command, after the player leaves the regulated gaming machine subsequent to cash-out or subsequent to a player balance reaching zero.

11. A method of adding a new game on a regulated gaming machine, comprising:

providing a library of regulatorily pre-certified software components configured to execute on the regulated gaming machine;

providing a menu of player-configurable regulated game titles that are playable at the regulated gaming machine, each game title being associated with a first at least one regulatorily pre-certified software component;

receiving a title selection, from a player of the regulated gaming machine, of one of the regulated game titles from the provided menu of regulated game titles;

providing a menu of betting configurations that are compatible with the selected regulated game title, each betting configuration being associated with a second at least one regulatorily pre-certified software component, the betting configurations including at least one of denomination and percentage Return To Player;

receiving a betting configuration selection, from the player of the regulated gaming machine, of at least one of the betting configurations from the provided menu of betting configurations;

configuring a new game to include the received betting configuration selection and at least the first at least one regulatorily pre-certified software component and the second at least one regulatorily pre-certified software component, the first at least one regulatorily pre-certified software component and the second at least one regulatorily pre-certified software component subsequently dynamically linked to provide a configured new game without requiring recertification of the new game by a gaming laboratory;

adding the configured new game to the regulated gaming machine, and enabling game play and execution of the configured new game on the regulated gaming machine.

* * * * *